(12) United States Patent
Jiang et al.

(10) Patent No.: US 7,534,510 B2
(45) Date of Patent: May 19, 2009

(54) FUEL COMPOSITIONS

(75) Inventors: Zhiping Jiang, Westford, MA (US);
Andrew G. Gilicinski, Westborough, MA (US); Javit A. Drake, Waltham, MA (US); Anna Maria Bofinger, Nashua, NH (US)

(73) Assignee: The Gillette Company, Boston, MA (US)

( * ) Notice: Subject to any disclaimer, the term of this patent is extended or adjusted under 35 U.S.C. 154(b) by 636 days.

(21) Appl. No.: 10/933,735

(22) Filed: Sep. 3, 2004

(65) Prior Publication Data

US 2006/0051627 A1    Mar. 9, 2006

(51) Int. Cl.
*H01M 8/00* (2006.01)
*C10L 7/00* (2006.01)

(52) U.S. Cl. .............................. 429/13; 429/12; 44/265; 44/268

(58) Field of Classification Search ........................ None
See application file for complete search history.

(56) References Cited

U.S. PATENT DOCUMENTS

| | | | |
|---|---|---|---|
| 3,380,934 A | 4/1968 | Batzold | |
| 3,418,168 A | 12/1968 | Wentworth | |
| 3,457,113 A | 7/1969 | Deibert | |
| 3,468,717 A | 9/1969 | Waters et al. | |
| 3,490,953 A | 1/1970 | Berger et al. | |
| 3,719,528 A | 3/1973 | Grasselli et al. | |
| 4,971,597 A * | 11/1990 | Gartner | 44/267 |
| 5,682,261 A | 10/1997 | Takada et al. | |
| 6,083,638 A | 7/2000 | Taniguchi et al. | |
| 6,554,877 B2 * | 4/2003 | Finkelshtain et al. | 44/436 |
| 6,627,341 B2 | 9/2003 | Klein et al. | |
| 6,641,948 B1 | 11/2003 | Ohlsen et al. | |
| 6,670,058 B2 | 12/2003 | Muradov | |
| 6,692,545 B2 | 2/2004 | Gittleman et al. | |
| 6,720,105 B2 | 4/2004 | Ohlsen et al. | |
| 6,849,581 B1 * | 2/2005 | Thompson et al. | 507/118 |
| 2002/0058173 A1 | 5/2002 | Alberti et al. | |
| 2002/0086192 A1 | 7/2002 | Lightner | |
| 2002/0110504 A1 | 8/2002 | Gittleman et al. | |
| 2004/0009381 A1 | 1/2004 | Sakai et al. | |

FOREIGN PATENT DOCUMENTS

DE    196 30 004 A1    1/1998

(Continued)

OTHER PUBLICATIONS

Wang et al., "Preparation of novel nano-SiO2-gel additive and performance of PEM fuel cell", Key Engineering Materials, 247 (Advanced Ceramics and Composites), 397-400, 2003.

(Continued)

*Primary Examiner*—Patrick Ryan
*Assistant Examiner*—Cynthia Lee
(74) *Attorney, Agent, or Firm*—Fish & Richardson P.C.

(57) ABSTRACT

Fuel compositions, methods of making the compositions, and fuel cell systems including a fuel composition are disclosed. In some embodiments, a fuel composition includes a polymer, and a fuel such as methanol, wherein the composition has a hardness of at least about 2 grams peak force, as determined by penetration test using a texture analyzer.

14 Claims, 2 Drawing Sheets

FOREIGN PATENT DOCUMENTS

| | | |
|---|---|---|
| DE | 101 28 011 A1 | 12/2002 |
| GB | 1108317 | 8/1965 |
| GB | 1142586 | 2/1966 |
| GB | 1498675 | 4/1975 |
| JP | 50-26771 | 3/1975 |
| JP | 60-220503 | 11/1985 |
| JP | 02-234358 * | 9/1990 |
| JP | 02-312164 | 12/1990 |
| JP | 2000-256007 | 9/2000 |
| JP | 2002-249032 | 9/2002 |
| JP | 2002-274802 | 9/2002 |
| JP | 2002-274804 | 9/2002 |
| JP | 2002-324558 | 11/2002 |
| JP | 2003-095603 | 3/2003 |
| JP | 2003-331900 | 11/2003 |
| JP | 2004-002114 | 1/2004 |
| JP | 2004-026759 | 1/2004 |
| JP | 2004-103271 | 4/2004 |
| WO | WO 00/63990 | 10/2000 |
| WO | WO 01/37357 A2 | 5/2001 |
| WO | WO 03/050902 A2 | 6/2003 |
| WO | WO 2004/019439 A1 | 3/2004 |
| WO | WO 2004/038801 A2 | 5/2004 |

OTHER PUBLICATIONS

Wang et al., "Preparation of a novel silica gel for electrode additive of PEMFCs", Journal of New Materials for Electrochemical Systems, 6(2), pp. 65-69, 2003.

Wang et al., "Preparation of a self-humidifying membrane electrode assembly for fuel cell and its performance analysis", Science in China, Series G: Physics, Astronomy, 46(5), pp. 501-508, 2003.

Kim et al., "A Sol-gel based approach to Synthesize High-Surface-Area Pt-Ru Catalysts as Anodes for DMFCs", Journal of the Electrochemical Society, 150(11), pp. A1421-A1431, 2003.

Hyeon et al., "High-performance direct methanol fuel cell electrodes using solid-phase-synthesized carbon nanocoils", Angewandte Chemie, International Edition, 42(36), pp. 4352-4356, 2003.

Song et al., "Study on on the methanol permeability in polyacrylamide solid gel membranes", Huagong Keji, 11(2), pp. 15-18, 2003.

Chang et al., "Proton conducting membranes based on PEG/Si02 nanocomposites for direct methanol fuel cells", Journal of Membrane Science, 218(1-2), pp. 295-306, 2003.

Deptula et al., "Preparation of Pt/WO3 powders and thin films on porous carbon black and metal supports by the complex sol-gel process", Journal of New Materials for Electrochemical Systems, 6(2), pp. 71-74, 2003.

Ma et al., "A new approach to deep desulfurization of gasoline, diesel fuel, and jet fuel by selective adsorption for ultra-clean fuels and for fuel cell applications", Catalysis Today, 77(1-2), pp. 107-116, 2002.

Fujisawa et al., "Operating properties of an adsorption heat pump driven by a fuel cell", Department of Engineering and Science, Nagoya University, Kagaku Kogaku Ronbunshu 28(3), pp. 247-254, 2002.

Mitsui et al., "Preparation of organic-inorganic composite electrolyte membrane for direct methanol fuel cell", Electrochemistry (Tokyo, Japan), 70(12), pp. 934-936, 2002.

Raghuveer et al., "Can La2-xSrxCuO4 be used as anodes for methanol fuel cells?", Preprints of Symposia—American Chemical Society, Division of Fuel Chemistry, 46(2), pp. 461-464, 2001.

Lavrencic et al., "Proton-conducting sol-gel hybrids containing hetropoly acids", Solid States Ionics, 145(1-4), pp. 109-118, 2001.

Wainwright et al., "Evaluation of a sol-gel derived Nafion/silica hybrid membrane for polymer electrolyte membrane fuel cell applications II. Methanol uptake and methanol permeability", Journal of the Electrochemical Society, 148(8), pp. A905-A909, 2001.

Peled et al., "A Direct Methanol Fuel Cell Based on a Novel Low-Cost Nanoporous Proton-Conducting Membrane", Electrochemical and Solid State Letters, 3(12), pp. 525-528, 2000.

Mineo et al., "Dissolution tests of spent fuel in the NUCEF 1K cell including dissolver off-gas treatment", JAERI-Conf (1999), 99-004 (Pt. 2, Proceedings of the NUCEF International Symposium, 1998), pp. 498-507.

Breiter, "Intermediate adsorbed on platinized platinum during the steady-stage oxidation of methyl alcohol, formic acid, and formaledhyde", Journal of Electroanalytical Chemistry, 14(4), pp. 1959-1966, 1967.

* cited by examiner

FUEL COMPOSITIONS

FIELD OF THE INVENTION

The invention relates to fuel compositions for fuel cells, and methods of making the compositions.

BACKGROUND

A fuel cell is a device capable of providing electrical energy from an electrochemical reaction, typically between two or more reactants. Generally, a fuel cell includes two electrodes, called an anode and a cathode, and a solid electrolyte disposed between the electrodes. The anode contains an anode catalyst, and the cathode contains a cathode catalyst. The electrolyte, such as a membrane electrolyte, is typically ionically conducting but electronically non-conducting. The electrodes and solid electrolyte can be disposed between two gas diffusion layers (GDLs).

During operation of the fuel cell, the reactants are introduced to the appropriate electrodes. At the anode, the reactant(s) (the anode reactant(s)) interacts with the anode catalyst and forms reaction intermediates, such as ions and electrons. The ionic reaction intermediates can flow from the anode, through the electrolyte, and to the cathode. The electrons, however, flow from the anode to the cathode through an external load electrically connecting the anode and the cathode. As electrons flow through the external load, electrical energy is provided. At the cathode, the cathode catalyst interacts with the other reactant(s) (the cathode reactant(s)), the intermediates formed at the anode, and the electrons to complete the fuel cell reaction.

For example, in one type of fuel cell, sometimes called a direct methanol fuel cell (DMFC), the anode reactants include methanol and water, and the cathode reactant includes oxygen (e.g., from air). At the anode, methanol is oxidized; and at the cathode, oxygen is reduced:

$$CH_3OH + H_2O \rightarrow CO_2 + 6H^+ + 6e^- \quad (1)$$

$$\tfrac{3}{2}O_2 + 6H^+ + 6e^- \rightarrow 3H_2O \quad (2)$$

$$CH_3OH + \tfrac{3}{2}O_2 \rightarrow CO_2 + 2H_2O \quad (3)$$

As shown in Equation (1), oxidation of methanol produces carbon dioxide, protons, and electrons. The protons flow from the anode, through the electrolyte, and to the cathode. The electrons flow from the anode to the cathode through an external load, thereby providing electrical energy. At the cathode, the protons and the electrons react with oxygen to form water (Equation 2). Equation 3 shows the overall fuel cell reaction.

SUMMARY

In one aspect, the invention features a fuel composition that can be used with a fuel cell system, such as a direct methanol fuel cell system. The fuel composition can be a freestanding and rigid structure that is capable of delivering a vapor phase fuel in low concentration and at a controlled rate without the need for mechanical assistance. As a result, the performance of the fuel cell system can be enhanced, and the cost of manufacturing can be reduced and/or simplified. Furthermore, the rigid fuel composition can be prepared from a liquid precursor composition that can be conveniently handled, e.g., for filling a fuel cartridge. Upon rigidification, the rigid fuel composition can be leak proof (thereby enhancing safety), and can deliver fuel consistently, independent of the orientation of the fuel container and/or fuel cell system.

In another aspect, the invention features a fuel composition, comprising a polymer, and a fuel, wherein the composition has a hardness of at least about 2 grams peak force as determined by a penetration test using a texture analyzer.

Embodiments may include one or more of the following features. The fuel includes methanol. The polymer forms a network structure, and the fuel is in the network structure. The polymer includes an inorganic element, such as a transition metal (e.g., titanium and zirconium). The inorganic element is a main group metal, such as silicon, aluminum, and boron. The polymer includes metal-nonmetal-metal bond. The composition includes at least about 40% by weight of methanol. The composition further includes a first material capable of reacting with water to form hydrogen, such as a hydride. The composition includes a concentration gradient of the first material. The composition further includes a flame retardant. The polymer includes an organic polymer. The composition further includes a water-sorbing material. The composition includes cross-linked silica.

In another aspect, the invention features a fuel composition, including an inorganic polymer forming a network of chemical bonds, and at least about 40% by weight of methanol in the network.

Embodiments may include one or more of the following features. The composition has a hardness of at least about 2 grams peak force, as determined by a penetration test using a texture analyzer. The inorganic polymer includes a metal-nonmetal-metal bond. The inorganic element is a transition metal or a main group metal, such as silicon, boron, aluminum, titanium, and zirconium. The composition further includes a first material capable of reacting with water to form hydrogen. The first material includes a hydride. The composition includes a concentration gradient of the first material. The composition further includes a flame retardant, such as a phosphate ether and/or antimony oxide. The composition further includes a water-sorbing material, such as poly(acrylic acid) and/or poly(acrylic acid-co-acrylamide).

In another aspect, the invention features a fuel cell system, including a fuel cell comprising an anode, a cathode, and an electrolyte between the anode and the cathode; and a fuel source in fluid communication with the anode, the fuel source comprising a composition comprising a polymer, and a fuel, wherein the composition has a hardness of at least about 2 grams peak force, as determined by penetration test using a texture analyzer.

Embodiments may include one or more of the following features. The fuel includes at least about 40% by weight methanol, and the polymer includes a network of chemical bonds including metals. The fuel composition further includes a water-sorbing material or a material capable of reacting with water to form hydrogen.

In another aspect, the invention features a method of making a fuel composition, including contacting a polymerizable material, methanol, and a catalyst; and polymerizing the polymerizable material.

Embodiments may include one or more of the following features. Polymerizing the polymerizable material includes heating the material to greater than 25° C. The polymerizable material includes a transition metal or a main group metal. The polymerized material has a hardness of at least about 2 grams peak force, as determined by penetration test using a texture analyzer. The polymerized material includes an inorganic element-oxygen-inorganic element bond. The methanol is present in at least about 40% by weight. The method further includes contacting a first material capable of reacting with water to form hydrogen to the polymerized material. The first material includes a hydride. The method further includes forming a concentration gradient of the first material in the polymerized material. The method further includes contacting a flame retardant to the polymerized material. The polymerizable material is organic. The method further includes contacting a water-sorbing material to the polymerized material. The polymerizable material includes a ceramic.

In another aspect, the invention features a fuel cell system including the fuel compositions described herein.

In another aspect, the invention features a method of operating a fuel cell system including placing an anode of the fuel cell system in fluid communication with the fuel compositions described herein.

Other aspects, features, and advantages will be apparent from the drawing, description, and claims.

DETAILED DESCRIPTION

Figure 1:
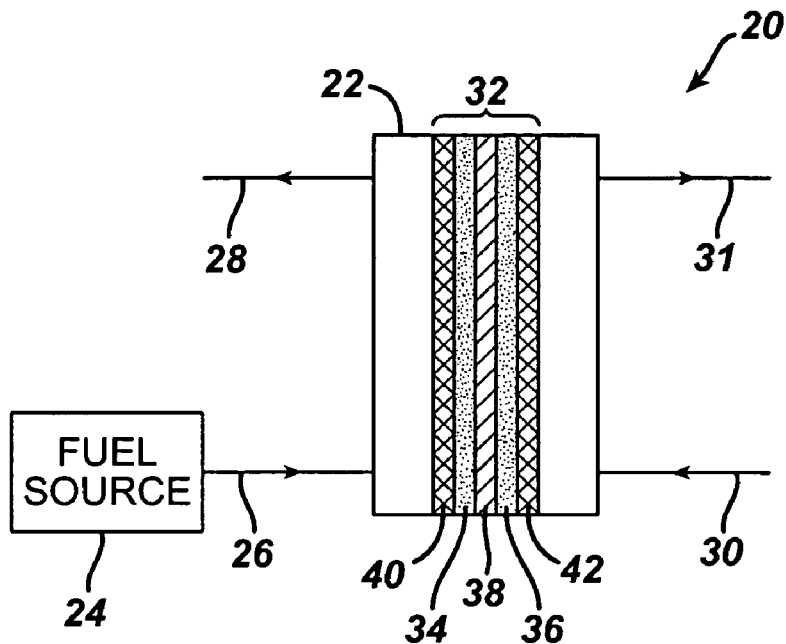
FIG. 1 is a schematic diagram of an embodiment of a fuel cell system.

Referring to FIG. 1, a fuel cell system 20, such as, a direct methanol fuel cell (DMFC) system, is shown. Fuel cell system 20 includes a fuel cell stack 22; a fuel source 24 in fluid communication with the fuel cell stack via a fuel inlet 26; a fuel outlet 28; a cathode reactant (e.g., air) inlet 30 in fluid communication with the fuel cell stack; and a cathode reactant outlet 31. For clarity, fuel cell stack 22 is shown having one fuel cell 32 (described below), but in other embodiments, the fuel cell stack includes a plurality of fuel cells, e.g., arranged in series or in parallel. Briefly, fuel cell 32 includes an anode 34 in fluid communication with fuel source 24, a cathode 36, and an electrolyte 38 between the anode and the cathode. Fuel cell 32 further includes two gas diffusion layers (GDL) 40 and 42, one disposed on each side of the electrolyte 38, anode 34, and cathode 36 assembly.

Fuel source 24 includes a self-supporting and rigid fuel composition that is capable of delivering a vapor phase fuel, such as methanol vapor, to fuel cell stack 22. The composition is capable of delivering fuel vapor in low concentration and at a controlled rate without the need for mechanical assistance (such as a pump or a valve) or a pervaporation membrane, thereby reducing cost and parasitic loss caused by power consumption of mechanical components, and increasing the energy density of the fuel cell system since more volume is made available for energy producing components. The controlled fuel delivery can also reduce migration of the fuel from the anode to the cathode (e.g., methanol crossover), which can cause parasitic loss (and reduced runtime) and mixed potentials at the cathode (and reduced output power.)

As described below, the fuel composition can be prepared from a liquid precursor composition that subsequently rigidifies to form the rigid fuel composition with no loss of fuel. As a result, the liquid precursor composition can be conveniently filled into a fuel container (e.g., a fuel cartridge) to conform to the volume available for fuel in the fuel container, thereby enhancing (e.g., maximizing) fuel capacity. Upon rigidification, the rigid fuel composition is essentially leak proof (thereby enhancing safety), and can deliver fuel consistently, regardless of the particular orientation of the fuel container and/or fuel cell system.

The rigid fuel composition can be prepared from a liquid precursor composition that includes methanol (a fuel), a polymerizable material, and a catalyst. The liquid precursor composition can be rigidified, for example, by heat curing the composition, to form a rigid polymeric network in which methanol is trapped in interstices defined by the polymeric network. In some embodiments, as described below, the fuel composition can further include one or more additives, such as a fire retardant, and/or the fuel composition can be used with one or more other materials that enhance fuel delivery performance.

The polymerizable material can be any material capable of forming a cross-linked network structure that can entrap the fuel, such as inorganic polymers, organic polymers, or their hybrids. Examples of inorganic polymers include cross-linked metal-containing compounds, such as organometallic materials. Examples of organometallic materials include main group metal compounds, such as siloxanes (e.g., polydimethoxysiloxane $(SiO(OCH_3)_2)$, alkyltrialkoxysilane $(R_1Si(OR_2)_3$, $R_1$ and $R_2$=methyl, ethyl, propyl, etc) tetraalkoxysilane $(Si(OR)_4$, R=methyl, ethyl, propyl, etc.), aluminum-containing compounds (e.g., $Al(OR)_3$, R=methyl, ethyl, propyl, etc.), and boron-containing compounds (e.g., $B(OR)_3$, R=methyl, ethyl, propyl, etc.); and transition metal compounds, such as titanium-containing compounds (e.g., $Ti(OR)_4$, R=methyl, ethyl, propyl, etc.) and zirconium-containing compounds (e.g., $Zr(OR)_4$, R=methyl, ethyl, propyl, etc.) These materials can form cross-linked network by reacting with water. In the case of tetramethoxysilane, the reaction can be described as $$Si(OCH_3)_4 + H_2O \rightarrow Si(OH)_4 + CH_3OH \qquad \text{(Reaction 1)}$$

The resulting silanols $(Si(OH)_4)$ can then condense form a cross-linked, rigid polymeric network structure including metal-nonmetal (e.g., oxygen)-metal bonds (in this example, —Si—O—Si— bonds) (Reaction 2).

$$Si(OH)_4 \rightarrow [SiO_x(OH)_y]_n + H_2O \qquad \text{(Reaction 2)}$$

The liquid precursor composition can include from about 1% by weight to about 40% by weight of the polymerizable material. For example, the liquid precursor composition can include greater than or equal to about 5%, 10%, 15%, 20%, 25%, 30%, or 35% by weight of the polymerizable material; and/or less than or equal to about 40%, 35%, 30%, 25%, 20%, 15%, 10%, or 5% by weight of the polymerizable material. Higher amounts of the polymerizable material can increase the rigidity of the fuel composition. In embodiments, the amount of water used to cross-link the organometallic compounds is enough to convert all the methoxy groups into hydroxy groups. In some embodiments, the precursor composition includes more than one type of polymerizable materials.

Another type of inorganic network can be formed by cross-linking ceramic particles, such as colloidal silica particles dispersed in methanol. The surface of these silica particles contains Si—OH groups, which can be condensed to connect the particles together to form a network of silica particles:

$$(\text{silica})\text{-OH} + \text{HO-}(\text{silica}) \rightarrow (\text{silica})\text{-O-}(\text{silica}) + H_2O \qquad \text{(Reaction 3)}$$

Examples of organic polymeric networks include cross-linked esters, styrenes, amides, acrylics, ethers, urethanes, aminopolymers, and/or epoxies. For example, one type of polymers can be formed by reacting resorcinol or melamine with formaldehyde to form a cross-linked polymer in the presence of acid or/base catalyst.

The catalyst can be any material capable of facilitating the formation of the network structure. For example, the catalyst used to polymerize the metal-methoxy compounds can be, a dilute acid solution (such as 0.10N $H_2SO_4$) or a dilute base solution (such as 0.10 N KOH). Other catalysts include HCl, $HNO_3$, organic acids such as RCOOH and $RSO_2OH$, NaOH, $NH_4OH$ and organic amines. The liquid precursor composition can include from about 0.01% by weight to about 0.5% by weight of the catalyst. In some embodiments, the precursor composition includes more than one catalyst.

Alternatively or additionally to methanol, the liquid precursor composition can include other fuels. Examples of fuels include other alcohols (such as ethanol), ethylene glycol, formic acid, and other oxidizable hydrocarbons. The liquid precursor composition can include from about 98% by weight to about 40% by weight of fuel. For example, the liquid precursor composition can include greater than or equal to about 40%, 45%, 50%, 55%, 60%, 65%, 70%, 75%, 80%, 85%, 90%, or 95% by weight of fuel; and/or less than or equal to about 98%, 95%, 90%, 85%, 80%, 75%, 70%, 65%, 60%, 55%, 50%, or 45% by weight of fuel. Higher amounts of the fuel can increase the capacity of the fuel composition. These amounts of fuel can correspond to the amounts of fuel in the rigid fuel composition. There can be no material loss as a result of rigidification, but in some embodiments, a very slight gain in the fuel concentration because the first of the two-step crosslinking reactions (e.g., Reaction 1) can generate fuel. In some embodiments, the precursor composition includes more than one fuel, e.g., a mixture of methanol and ethanol.

In addition to the fuel, the polymerizable material, and the catalyst, the liquid precursor composition can include one or more additives. For example, the precursor composition can include a colorant (such as a dye or a pigment) to facilitate leak detection and clean up. The precursor composition can include a flame retardant (such as phosphate ethers and antimony oxides) to suppress flames in the event of a failure. In some embodiments, particles or a dispersion of a flame retardant can be incorporated into the fuel composition during rigidification.

The rigid fuel composition can be prepared by combining the components of the liquid precursor composition, and polymerizing the polymerizable material to rigidify the precursor composition. In some embodiments, the liquid precursor composition is sealed during polymerization to reduce loss of the volatile fuel. Polymerization can occur at ambient conditions or at elevated temperatures (e.g., from about 45° C. to about 60° C.) over about 6 hrs to about 20 days. For example, a liquid precursor composition including 13.51% by weight of tetramethoxysilane, 81.08% by weight of methanol, and 5.41% by weight of 0.01 N KOH (catalyst) start to solidify at ambient temperatures for about 3 days at 45° C. for about 1 day.

The rigidity of the solid fuel can be measured using a texture analyzer. In a penetration test, the peak force needed to break into the solid fuel composition was measured to be equal to or greater than about 2 g of maximum force, based on a probe having an area 0.25" diameter and penetration speed of 1 mm/sec, and using an XT2i Texture Analyzer manufactured by Texture Technology Corp. The principle of the texture analysis is described in "Food Texture & Viscosity-Concepts and Measurement" by Malcolm Bourne; 2nd edition, Academic Press. In some embodiments, from about 2 grams to about 150 grams of maximum force is needed to break into the solid fuel composition. The maximum force can be greater than or equal to about 10, 20, 30, 40, 50, 60, 70, 80, 90, 100, 110, 120, 130, or 140 grams; and/or less than or equal to about 150, 140, 130, 120, 110, 100, 90, 80, 70, 60, 50, 40, 30, 20, or 10 grams. Expressed another way, the rigid fuel composition can be sufficiently immobile, e.g., similar to set gelatin, such that it does not noticeably flow when held upside down in a container.

As indicated above, in some embodiments, the rigid fuel composition can be used with one or more other materials that enhance fuel delivery performance. For example, during operation of fuel cell system 20, water from fuel cell 32 (e.g., from the anode chamber) can diffuse to fulel source 24, dilute the fuel, and reduce the rate of fuel delivery and power output. To enhance fuel delivery and power output, the rigid fuel composition can be used in combination with one or more materials capable of sorbing water. In embodiments, the use of water-sorbing materials is limited to solid fuel formulation in which water is not needed for the polymerization process. For some water-sorbing materials, they can interact with water and swell and that can facilitate cracking of the rigid fuel composition (which can crack during discharge without a water-sorbing material), thereby increasing the surface area of the rigid fuel composition, increasing the rate of fuel delivery, and offsetting the fuel dilution by the water. Examples of water-sorbing materials include superabsorbent polymers such as lightly cross-linked poly (acrylic acid) or its sodium and potassium salt, and poly (acrylic acid-co-acrylamide) or its sodium and potassium salt.

The water-sorbing material can be used with the fuel composition in different ways. For example, the water-sorbing material can be incorporated as particles dispersed into the liquid precursor composition, and/or into the fuel composition at selected stages during rigidification to further suspend the particles. Alternatively or additionally, the water-sorbing material can be formed as a structure (e.g., a honeycomb structure or porous structure) that is placed in the fuel container, and the liquid precursor composition can be poured into the container and rigidified around the structure. In some embodiments, a concentration gradient of the water-sorbing material can be formed in the fuel container. For example, the concentration of the water-sorbing material used in the fuel composition can increase (linearly or nonlinearly) with increasing distance from the surface of the fuel composition. As a result, the fuel composition can be more likely to crack and to expose additional surface area as the fuel composition is consumed, thereby offsetting the effects of fuel dilution by water. Alternatively, to enhance capacity, the water-sorbing material can be placed only at selected portions away from the surface of the fuel composition to sorb water only at selected (e.g., later) stages of fuel discharge.

Alternatively or additionally to the water-sorbing material, the rigid fuel composition can be used with one or more materials capable of providing a voltage boost during discharge, for example, by generating a fuel. For example, the rigid fuel composition can include a material capable of reacting with water to form hydrogen, which can offset a power loss from a drop in fuel delivery rate during discharge (e.g., due to water dilution). Examples of fuel generating materials include hydrides such as lithium aluminum hydride, sodium borohydride, lithium hydride, and potassium hydride, magnesium hydride, and calcium hydride. Similar to the water-sorbing material, the fuel generating materials can be used as dispersed particles and/or as a preformed structure (e.g., a honeycomb structure). A concentration gradient of the fuel generating material can be created as described above. Alternatively, the fuel generating material can be placed only at selected portions away from the surface of the fuel composition to provide a voltage boost at selected (e.g., later) stages of fuel discharge.

Referring again to FIG. 1, an example of fuel cell 32 will now be described. Fuel cell 32 includes electrolyte 38, anode 34 bonded on a first side of the electrolyte, and cathode 36 bonded on a second side of the electrolyte. Electrolyte 38, anode 34, and cathode 36 are disposed between gas diffusion layers (GDLs) 40 and 42.

Electrolyte 38 should be capable of allowing ions to flow therethrough while providing a substantial resistance to the flow of electrons. In some embodiments, electrolyte 38 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 38 can also be prepared from the commercial product GORE-SELECT, available from W.L. Gore & Associates (Elkton, Md.).

Anode 34 can be formed of a material, such as a catalyst, capable of interacting with methanol and water to form carbon dioxide, protons and electrons. Examples of such materials include, for example, platinum, platinum alloys (such as Pt—Ru, Pt—Mo, Pt—W, or Pt—Sn), platinum dispersed on carbon black. Anode 34 can further include an electrolyte, such as an ionomeric material, e.g., NAFION, that allows the anode to conduct protons. Alternatively, a suspension is applied to the surfaces of gas diffusion layers (described below) that face solid electrolyte 38, and the suspension is then dried. The method of preparing anode 34 may further include the use of pressure and temperature to achieve bonding.

Cathode 36 can be formed of a material, such as a catalyst, capable of interacting with oxygen, electrons and protons to form water. Examples of such materials include, for example, platinum, platinum alloys (such as Pt—Co, Pt—Cr, or Pt—Fe) and noble metals dispersed on carbon black. Cathode 36 can further include an electrolyte, such as an ionomeric material, e.g., NAFION, that allows the cathode to conduct protons. Cathode 36 can be prepared as described above with respect to anode 34.

Gas diffusion layers (GDLs) 40 and 42 can be formed of a material that is both gas and liquid permeable. Examples of GDLs are available from various companies such as Etek in Natick, Mass., SGL in Valencia, Calif., and Zoltek in St. Louis, Mo. GDLs 40 and 42 can be electrically conductive so that electrons can flow from anode 34 to an anode flow field plate (not shown) and from a cathode flow field plate (not shown) to cathode 36.

Other embodiments of direct methanol fuel cells and fuel cell systems, including methods of use, are described, for example, in commonly assigned U.S. Ser. No. 10/779,502, filed Feb. 13, 2004, and entitled "Fuel Cell"; "Fuel Cell Systems Explained", J. Laraminie, A. Dicks, Wiley, New York, 2000; "Direct Methanol Fuel Cells: From a Twentieth Century Electrochemist's Dream to a Twenty-first Century Emerging Technology", C. Lamy, J. Leger, S. Srinivasan, Modern Aspects of Electrochemistry, No. 34, edited by J. Bockris et al., Kluwer Academic/Plenum Publishers, New York (2001) pp. 53-118; and "Development of a Miniature Fuel Cell for Portable Applications", S. R. Narayanan, T. I. Valdez and F. Clara, in Direct Methanol Fuel Cells, S. R. Narayanan, S. Gottesfeld and T. Zawodzinski, Editors, Electrochemical Society Proceedings, 2001-4 (2001) Pennington, N.J., all hereby incorporated by reference.

During operation of fuel cell system 20, fuel vapor from the rigid fuel composition from fuel source 24 is introduced to anode 34, a cathode reactant (such as air) is introduced to cathode 36, and electrical energy is produced from the respective oxidation and reduction reactions as described above. As the fuel from the rigid fuel composition is consumed during discharge, the fuel composition can crack to enhance the rate of fuel delivery. In embodiments in which the rigid fuel composition includes a water-sorbing material and/or a fuel generating material, cracking of the fuel composition can be enhanced and/or a voltage boost can be provided, for example, to offset a decrease in the rate of fuel delivery due to fuel dilution. Excess fuel and cathode reactant exit through outlets 28 and 31, respectively.

The following examples are illustrative and not intended to be limiting.

EXAMPLE 1

Two-and-a-half grams of tetramethoxysilane (99+%, Aldrich Chemical Company), 0.43 g 0.1 N sulfuric acid in water (Reagent grade, Fisher Scientific), and 27.00 g of methanol (99.8+%, Aldrich Chemical Company) were mixed to form a solution. The solution was placed in a 100 ml glass vial, and the vial was stored in a 60° C. oven for 16 h. The resulting solution was then mixed with 1.30 g of 0.1 N potassium hydroxide solution in water (Reagent grade, Fisher Scientific) forming a solution. The solution in the vial was then converted into a rigid form after it was stored in a 45° C. oven for about 24 hours.

Similarly, other fuel compositions were prepared and they are listed in Table 1.

TABLE 1

Methanol Fuel Compositions

| Sample | Tetramethoxy-silane (g) | 0.1 N $H_2SO_4$ (g) | 0.1 N KOH (g) | Methanol (g) | Time to solidify |
|---|---|---|---|---|---|
| 1 | 2.50 | 0.43 | 1.30 | 27.0 | 24 hrs |
| 2 | 2.50 | 0.40 | 1.30 | 35.0 | 24 hrs |
| 3 | 2.50 | 0.41 | 1.30 | 45.0 | 48 hrs |

EXAMPLE 2

Two-and-a-half grams of tetramethoxysilane, 1.00 gram of 0.01 N KOH (Reagent grade, Fisher Scientific) in water and 10.0 g of methanol were mixed to form a solution. The solution was placed in a 30 ml glass vial and the vial was stored in a 45° C. oven. After 24 h the solution in the vial formed a rigid form.

Similarly, other fuel compositions were prepared and they are listed in Table 2.

TABLE 2

Methanol Fuel Compositions

| Sample | Tetramethoxy-silane (g) | 0.01 N KOH (g) | Methanol (g) | Time to solidify |
|---|---|---|---|---|
| 1 | 2.50 | 1.00 | 10 | 24 hrs |
| 2 | 2.50 | 1.50 | 10 | 24 hrs |
| 3 | 2.50 | 1.00 | 15 | 24 hrs |
| 4 | 2.50 | 1.50 | 15 | 24 hrs |

EXAMPLE 3

Five grams of polydimethoxysiloxane (26.0-27.0% Si, Gelest Inc.), 1.76 g of 1 N hydrochloric acid in water (Reagent grade, Fisher Scientific), and 5 g of methanol were mixed to form a solution. The solution was placed in a 30 ml glass vial, and the vial was stored in a 45° C. oven. The solution in the vial converted into a rigid form after it was stored in the oven for about 6 hours.

Similarly, other fuel compositions were prepared and they are listed in Table 3.

TABLE 3

Methanol Fuel Compositions

| Sample | Polydimethoxy-siloxane (g) | 1 M HCl (g) | Methanol (g) | Time of solidify |
|---|---|---|---|---|
| 1 | 5 | 1.76 | 5 | 6 hrs |
| 2 | 5 | 3.52 | 5 | 6 hrs |
| 3 | 2.5 | 0.88 | 5 | 5 days |
| 4 | 2.5 | 1.76 | 5 | 5 days |
| 5 | 2.5 | 0.88 | 7.5 | 5 days |
| 6 | 2.5 | 0.76 | 7.5 | 5 days |

EXAMPLE 4

Two-and-a-half grams of polydimethoxysiloxane, 0.88 g of 0.1 N potassium hydroxide in water, and 15 g of methanol were mixed to form a solution. The solution was placed in a 30 ml glass vial, and the vial was stored in a 45° C. oven. The solution in the vial converted into a rigid form after it was stored in the oven for about 16 hours.

Similarly, other fuel compositions were prepared and they are listed in Table 4.

TABLE 4

Methanol Fuel Compositions

| Sample | Polydimethoxy-siloxane (g) | 0.1 M KOH (g) | Methanol (g) | Time to solidify |
|---|---|---|---|---|
| 1 | 2.5 | 0.88 | 15 | 16 hrs |
| 2 | 2.5 | 1.76 | 15 | 16 hrs |
| 3 | 2.5 | 0.88 | 20 | 16 hrs |
| 4 | 2.5 | 1.76 | 20 | 16 hrs |
| 5 | 1.25 | 0.44 | 12.5 | 3 days |
| 6 | 0.625 | 0.25 | 8 | 5 days |
| 7 | 0.625 | 0.22 | 10 | 7 days |
| 8 | 0.625 | 0.44 | 15 | 7 days |
| 9 | 0.625 | 0.66 | 10 | 20 days |

EXAMPLE 5

Figure 2:
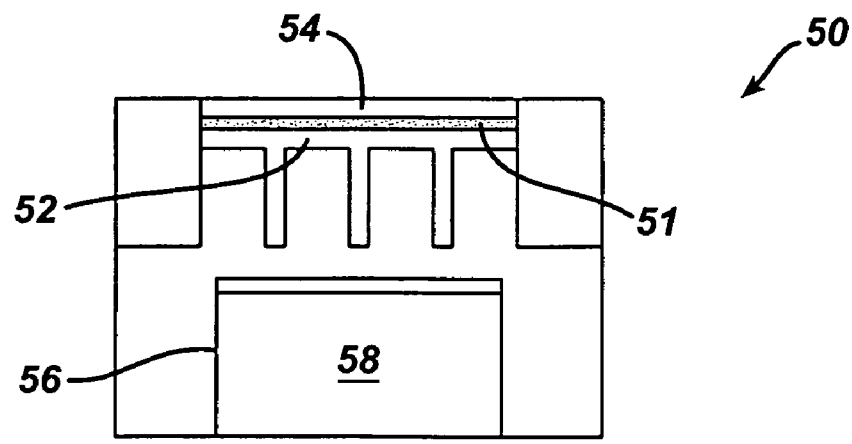
FIG. 2 is a schematic diagram of an embodiment of a test cell fixture.

A discharge test of a direct methanol fuel cell having 1.54 g of Sample 2 in Table 1 was conducted at 26° C. and 30% relative humidity with a test cell fixture. The test cell fixture 50 (shown in FIG. 2) had an active electrode area of 5 cm$^2$, and the membrane electrode assembly (MEA) consisted of a proton-conducting polymer electrolyte membrane 51 (NAFION) sandwiched with two identical backing layers made from carbon cloth coated with a microporous layer of carbon and TEFLON mixture. The anode side 52 of the NAFION membrane was coated with a catalysts layer containing 4 mg/cm$^2$ of Pt/Ru, and the cathode side 54 of the membrane was coated with a catalyst layer containing 4 mg/cm$^2$ of Pt. The MEA was attached to the cell assembly in a way that the air-breathing occurred with the ambient air passing through the porous cathode side. On the anode side, an anode chamber was formed by a sealed internal space of the cell body hosting a fuel cup 56 containing the rigid methanol fuel 58. During the test the methanol vapor from the fuel was fed into the anode and the passive air was exposed to the cathode.

Figure 3:
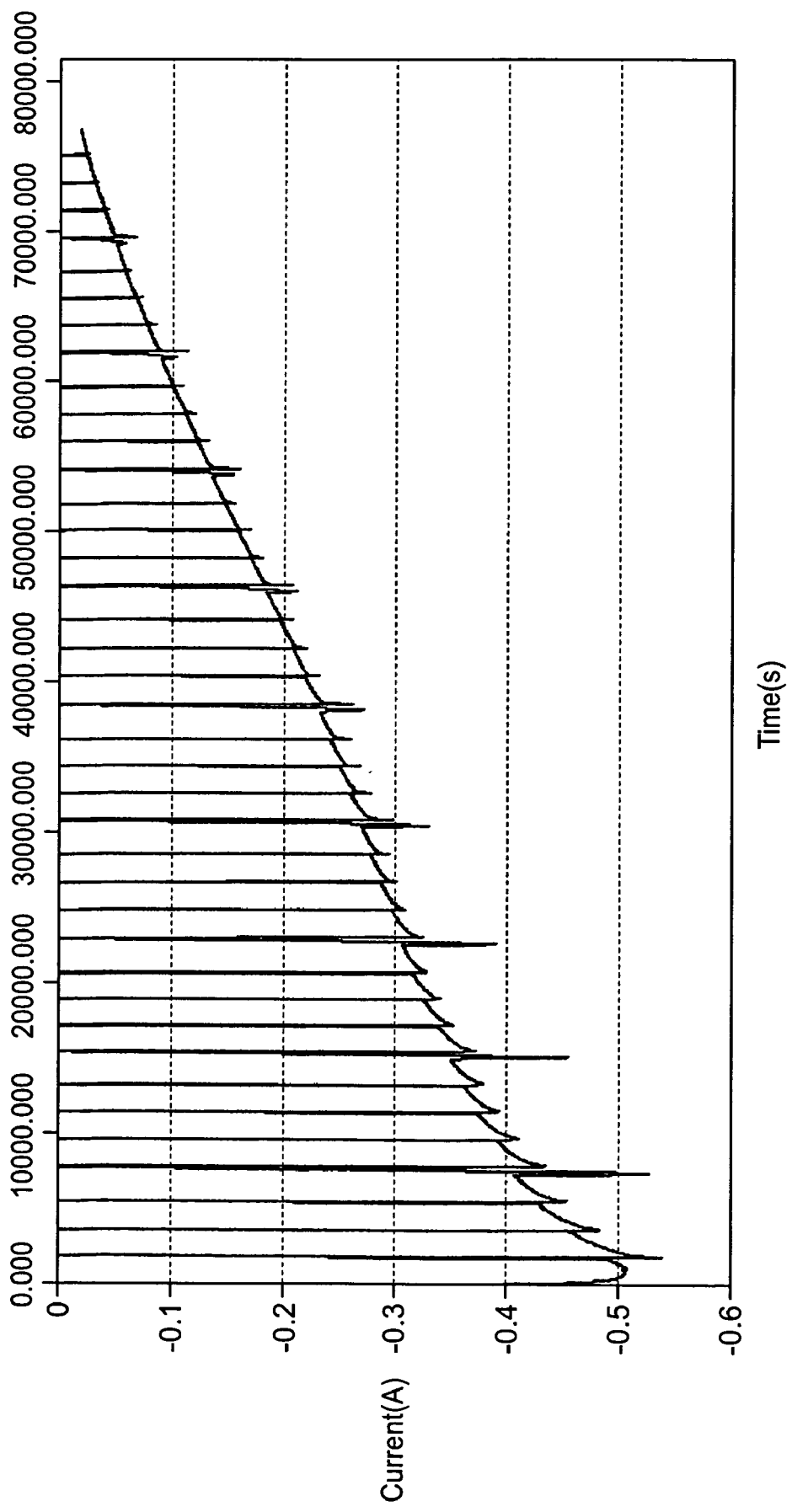
FIG. 3 is a plot of current vs. time.

The fuel cell performance test was performed with a test protocol of discharging the cell at a constant voltage of 0.3 V. Once every 2 hrs during the test, the cell voltage was scanned from 0.3 V to 0.18 V to check the cell current, which can provide information on the limiting fuel feed rate. FIG. 3 is a plot of the cell current during a test run of 21.3 hrs. The cell delivered 1.45 Wh of energy during the test.

All references, such as patent applications, publications, and patents, referred to herein are incorporated by reference in their entirety.

Other embodiments are in the claims.

What is claimed is:

1. A fuel cell system, comprising:
    a fuel cell comprising an anode, a cathode, and an electrolyte between the anode and the cathode; and
    a fuel source in fluid communication with the anode, the fuel source comprising a composition comprising a polymer, a fuel, a concentration gradient of material capable of reacting with water to form hydrogen, wherein the composition has a hardness of at least about 2 grams peak force, as determined by penetration test using a texture analyzer.

2. The system of claim 1, wherein the fuel comprises at least about 40% by weight methanol, and the polymer comprises a network of chemical bonds including metals.

3. The full cell system of claim 1, wherein the polymer comprises an inorganic element.

4. The full cell system of claim 3, wherein the inorganic element is a transition metal.

5. The full cell system of claim 4, wherein the transition metal is selected from the group consisting of titanium and zirconium.

6. The full cell system of claim 3, wherein the inorganic element is a main group metal.

7. The full cell system of claim 6, wherein the main group metal is selected from the group consisting of silicon, aluminum, and boron.

8. The full cell system of claim 1, wherein the polymer comprises metal-nonmetal-metal bond.

9. The full cell system of claim 1, wherein the material comprises a hydride.

10. The full cell system of claim 1, wherein the rigid composition further comprises a flame retardant.

11. The full cell system of claim 1, wherein the polymer comprises an organic polymer.

12. The full cell system of claim 1, wherein the rigid composition further comprises a water-sorbing material.

13. The full cell system of claim 1, wherein the rigid composition comprises cross-linked silica.

14. The fuel cell of claim 1, wherein the polymer comprises a metal-nonmetal-metal bond.

* * * * *

UNITED STATES PATENT AND TRADEMARK OFFICE
CERTIFICATE OF CORRECTION

| | | |
|---|---|---|
| PATENT NO. | : 7,534,510 B2 | Page 1 of 1 |
| APPLICATION NO. | : 10/933735 | |
| DATED | : May 19, 2009 | |
| INVENTOR(S) | : Zhiping Jiang et al. | |

It is certified that error appears in the above-identified patent and that said Letters Patent is hereby corrected as shown below:

Col. 10, line 57;
In claim 14, line 1, delete "cell" and insert --cell system--.

Signed and Sealed this

Fourteenth Day of July, 2009

JOHN DOLL
*Acting Director of the United States Patent and Trademark Office*